Figure 3:
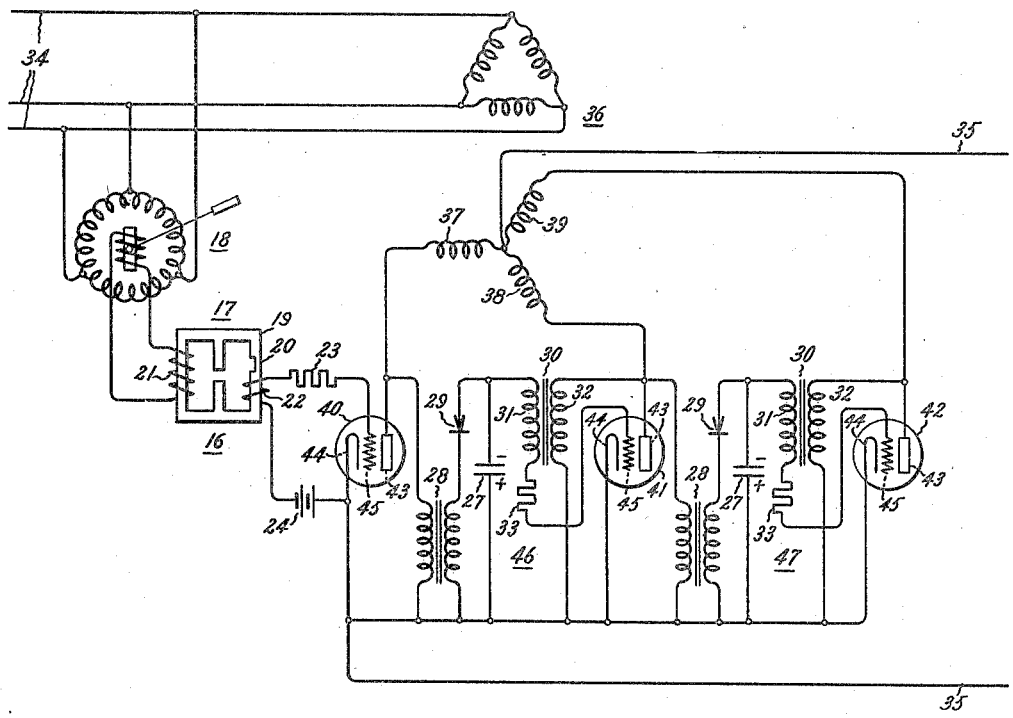

Sept. 26, 1939.                D. E. CHAMBERS                2,174,379
                        ELECTRIC VALVE CONTROL SYSTEM
                   Original Filed Feb. 27, 1937    2 Sheets-Sheet 1
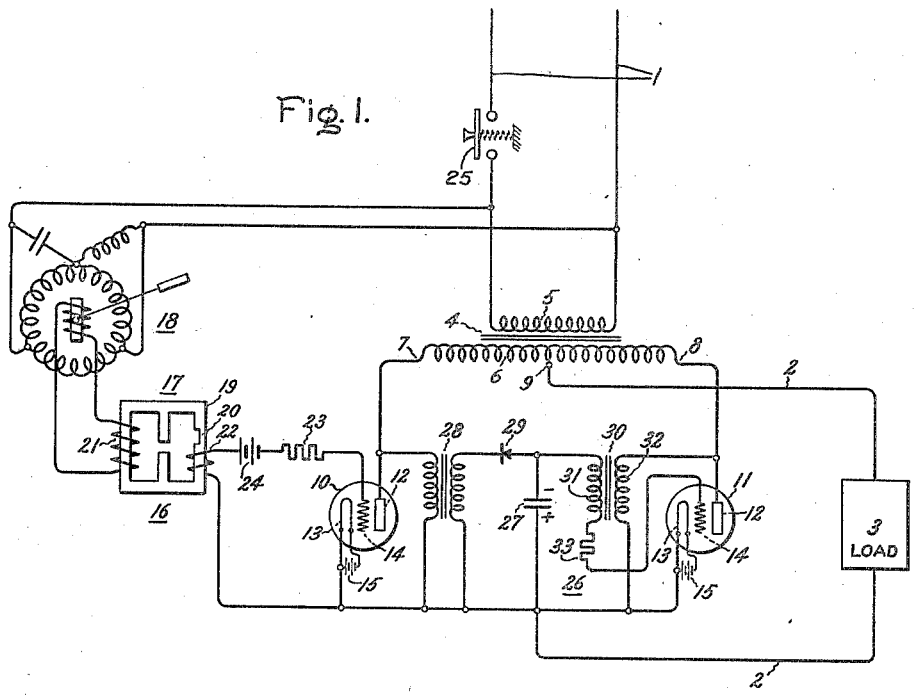
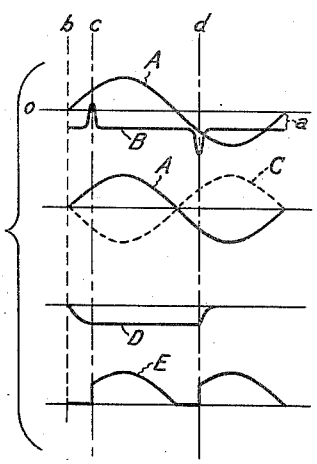
Inventor:
Dudley E. Chambers
by Harry E. Dunham
His Attorney.

Sept. 26, 1939.  D. E. CHAMBERS  2,174,379
ELECTRIC VALVE CONTROL SYSTEM
Original Filed Feb. 27, 1937   2 Sheets-Sheet 2

Inventor:
Dudley E. Chambers,
by Harry E. Dunham
His Attorney.

Patented Sept. 26, 1939

2,174,379

UNITED STATES PATENT OFFICE 2,174,379

ELECTRIC VALVE CONTROL SYSTEM

Dudley E. Chambers, Schenectady, N. Y., assignor to General Electric Company, a corporation of New York Application February 27, 1937, Serial No. 128,199
Renewed April 11, 1939

12 Claims. (Cl. 175—363)

My invention relates to electric valve circuits and more particularly to control circuits for electric valve apparatus.

In the design and arrangement of electric valve apparatus it is highly important from the standpoint of apparatus economy to provide control circuits which are small in size and rating relative to the main apparatus. On the other hand, it is important that the control apparatus be susceptible of functioning in a precise and reliable manner to provide the required control without sacrificing the wide range of control available in electric valve apparatus. Heretofore, in the majority of instances in the control of electric valve apparatus, it has been customary to effect control of electric valve means by employing a plurality of separate excitation circuits energized from an external source. Where the control of the electric valves was accomplished by phase shifting devices, these devices were required to have a capacity sufficiently large to energize all the control circuits and where other types of excitation or control systems have been used there has resulted a sacrifice in the range and flexibility of control.

It is an object of my invention to provide a new and improved electric valve circuit.

It is another object of my invention to provide a new and improved control system for electric valve apparatus.

It is a further object of my invention to provide a new and improved control system for electric valve apparatus in which there is effected a considerable economy in apparatus without necessitating a sacrificing in the precision of control.

In accordance with the illustrated embodiment of my invention, I provide a control or excitation system for electric valve apparatus whereby electric valves employed are controlled in a precise and reliable manner. More particularly, the control system relates to the control of a plurality of arc discharge paths or electric valves which are intended to conduct current in a predetermined order or sequence. One electric valve in the group is energized from an external control circuit through a suitable phase shifting device for controlling the phase of the control voltage impressed on the control member of the electric valve. Each of the other electric valves is provided with a separate control or excitation circuit including an energy storage device, such as a capacitance, which is energized in accordance with the voltage appearing across the anode and cathode of the electric valve preceding it in the order of phase rotation or the order in which the electric valves conduct current. Each of these capacitances is charged through a unidirectional conducting device and impresses on the associated control member a negative biasing potential to maintain the associated electric valve non-conductive until the proper time during each positive half cycle of anode-cathode voltage. When the anode-cathode voltage obtains a certain value, the negative biasing potential is neutralized or rendered ineffective to permit the associated electric valve to conduct. By the proper adjustment of the various excitation circuits, the electric valves will be rendered conductive at corresponding times during the respective positive half cycles of anode-cathode voltage to cause the valves to conduct current for equal intervals of time each being less than the positive half cycle of anode voltage.

For a better understanding of my invention reference may be had to the following description taken in connection with the accompanying drawings and its scope will be pointed out in the appended claims. Fig. 1 of the accompanying drawings diagrammatically shows an embodiment of my invention as applied to an electric valve system for transmitting energy between a single phase alternating current circuit and a direct current circuit, and Fig. 2 represents certain operating characteristics thereof. Fig. 3 diagrammatically shows my invention as applied to an electric valve system for transmitting energy between a three phase alternating current circuit and a direct current circuit.

Referring to Fig. 1 of the accompanying drawings, where my invention is diagrammatically shown as applied to an electric valve system for transmitting energy between a single alternating current circuit 1 and a direct current circuit 2 to a load device 3, I provide a control system which is readily adaptable to electric valve means generally and which is susceptible of precise and reliable operation. Energy is transmitted from the alternating current circuit 1 to the direct current circuit 2 through a transformer 4 having a primary winding 5 and a secondary winding 6 having terminal connections 7 and 8 and a connection 9 electrically intermediate the terminal connections 7 and 8. Electric valves 10 and 11, which may be of the type employing ionizable mediums or of the high vacuum type, are associated with the left-hand and the right-hand portions respectively, of secondary winding 6 and serve to transmit current alternately to the direct current circuit 2. Each of the electric valves 10 and 11 includes an anode 12, a cathode 13 and a control member 14, and each provides a discharge path between the associated anode and cathode which is controlled by the associated control member. Any suitable source of energy, such as batteries 15, may be employed to energize the cathodes 13.

In order to control the conductivity of the electric valve 10 to render the electric valve conductive at a predetermined time during a selected positive half cycle or at predetermined times during successive positive half cycles of anode-cathode voltage, I provide an excitation circuit 16 including a transformer 17 and a suitable phase shifting device such as a rotary phase shifter 18 which may be energized from any suitable source of alternating current correlated in frequency with the alternating current circuit 1. In the arrangement shown in Fig. 1 the phase shifter 18 is shown as being energized from the alternating current circuit 1 and is shown as being of the manually adjustable type. It should be understood that other phase shifting devices may be employed and that the phase shifting device may be controlled automatically in accordance with a predetermined electrical condition of the associated circuits, or in accordance with a predetermined electrical condition of the associated electric valve translating apparatus. Where electric valves 10 and 11 are of the type employing an ionizable medium, it may be desirable to control the electric valves by employing means for impressing on the control members thereof voltages of peaked wave form. Transformer 17 may be of the type to provide a voltage of peaked wave form including a core member 19 having a restricted saturable portion 20, a primary winding 21 and a secondary winding 22 in which there is induced a voltage of peaked wave form. While any means for providing a voltage of peaked wave form may be employed, I have chosen to represent the excitation circuit 16 as comprising a transformer of the saturable type for providing this voltage of peaked wave form. Of course, in applications employing electric valves of the high vacuum type, it will be necessary to dispense with the means for providing a voltage of peaked wave form and to control the conductivity of the electric valve means 10 by the agency of a voltage of sinusoidal wave form or by control of unidirectional voltages. One terminal of the secondary winding 22 of transformer 17 is connected to the control member 14 of electric valve 10 through a current-limiting resistance 23 and a suitable source of negative biasing potential such as a battery 24. The other terminal of the secondary winding 22 is connected to the cathode 13 of electric valve 10. A circuit controlling means such as a switch 25 may be connected in series with the source 1 and primary winding 5 of transformer 4 to control the energization of the system. While for the purpose of illustrating my invention I have chosen to represent the switch 25 as being of the push button type which may be employed in welding circuits where short periods of energization are desired, it is to be understood that any other conventional circuit controlling means may be employed where it is desired to effect continuous energization of the circuit.

An excitation circuit 26 is associated with electric valve means 11 to control the conductivity thereof and to render the electric valve conductive at times during the positive half cycles of applied anode-cathode voltage corresponding to the times at which the electric valve 10 is rendered conductive during the respective positive half cycles of applied anode-cathode voltage. The control or excitation circuit 26, which is energized in accordance with an electrical condition such as the voltage appearing across the anode and cathode of electric valve 10, comprises an energy storage device such as a capacitance 27 which serves to impress on the control member 14 of electric valve 11 a suitable negative biasing potential to maintain the electric valve 11 nonconductive until a predetermined time during each positive half cycle of anode-cathode voltage. The capacitance 27 is energized in accordance with an electrical condition of electric valve 10, such as the voltage appearing across the anode 12 and the cathode 13, through a suitable inductive device such as a transformer 28 and a unidirectional conducting device 29 which may be of the contact rectifying type. The unidirectional conducting device 29 permits the charging of the capacitance 27 to establish a negative charge on the upper plate thereof and prevents the discharge of the capacitance 27 through the secondary winding of transformer 28 even though the voltage appearing across the anode 12 and cathode 13 of electric valve 10 has decreased to a relatively small value. In order to control the energization of control member 14 of electric valve 11 in accordance with an electrical condition thereof or in accordance with an electrical condition of the associated circuit, I provide a suitable inductive device such as a transformer 30 which may have a primary winding 31 and a secondary winding 32. It is to be understood that I may employ an auto-transformer if desired. The negative biasing potential provided by the capacitance 27 may be impressed on the control member 14 of electric valve 11 through primary winding 31 of transformer 30. The upper or negative plate of the capacitance 27 is connected to the upper terminal of primary winding 31 and the lower terminal of primary winding 31 is connected to the control member 14 of electric valve 11 through a current-limiting resistance 33. The secondary winding 32 of transformer 30 is connected across the anode 12 and cathode 13 of electric valve 11 to introduce in the excitation circuit 26 a positive voltage for neutralizing or for rendering ineffective the negative biasing potential provided by the capacitance 27 at the time at which the electric valve 11 is to be rendered conductive.

The operation of the embodiment of my invention diagrammatically shown in Fig. 1 may be best explained by considering the system when it is operating to transmit unidirectional current from the alternating current circuit 1 to the load device 3 through the direct current circuit 2, transformer 4 and electric valves 10 and 11. As will be well understood by those skilled in the art, that when electric valves 10 and 11 are of the type employing an ionizable medium, these valves may be rendered conductive by impressing on the control members 14 potentials which are sufficiently positive relative to the potential impressed on the associated cathode 13. The valves will remain conductive thereafter until the anode-cathode voltage reverses polarity. Furthermore, it will be understood that when there is substantial phase coincidence between the anode and control member voltages, the conductivity of the electric valves will be a maximum and that when there is substantial phase opposition the conductivity thereof will be substantially zero. For intermediate phase relationships the conductivities will assume corresponding intermediate values. Let it be assumed that the phase shifter 18 is adjusted so that the voltage of peaked wave form induced in secondary winding 22 of transformer 17 is retarded in phase relative to the anode voltage of electric valve 10. Referring to the operating characteristics shown in Fig. 2 of the accompanying drawings, curve A represents the voltage impressed on the anode 12 of electric valve 10 and curve B represents the voltage of peaked wave form impressed on the control member 14 of electric valve 10 when the switch 25 is in the closed circuit position. The displacement $a$ of curve B below the zero axis is effected by means of the battery 24. Curve C represents the voltage impressed on the anode 12 of electric valve 11 and is 180 electrical degrees out of phase with the voltage impressed on anode 12 of electric valve 10. If it be assumed that the switch 25 is closed at approximately the time corresponding to the position of line $b$, during the interval $b—c$ the capacitance 27 will be charged in accordance with the voltage appearing across the anode 12 and cathode 13 of electric valve 10. A negative charge will be established on the upper plate of capacitance 27 through a circuit including the secondary winding of transformer 28 and the unidirectional conducting device 29. If the electric valves 10 and 11 are of the type employing an ionizable medium, such as a gas or a vapor, electric valve 10 will remain conductive until the anode becomes negative in potential relative to the cathode, or, in other words, after the arc discharge has been initiated by the control member 14 the arc will be maintained until the anode-cathode voltage reverses polarity. Curve D represents the neagtive biasing potential impressed on the control member 14 of electric valve 11 by the capacitance 27. Since electric valve 11 will not be rendered conductive until there is impressed on the control member 14 a voltage which is sufficiently positive relative to the cathode 13, this electric valve will not be rendered conductive until a time corresponding to the position of line $d$, at which time the anode-cathode voltage appearing across electric valve 11 introduces in excitation circuit 26 through transformer 30 a voltage to neutralize or render ineffective the negative biasing potential provided by the capacitance 27 effecting energization of control member 14 of electric valve 11. When the voltage appearing across anode 12 and cathode 13 of electric valve 11 reaches a predetermined value corresponding to that for which the system is adjusted, electric valve 11 will conduct current. After electric valve 11 is rendered conductive, capacitance 27 will begin to discharge through a circuit including primary winding 31, of transformer 30, resistance 33, control member 14 and cathode 13 of electric valve 11. The rate at which the capacitance 27 discharges will, of course, depend upon the time constant of the above circuit. The capacitance 27 will then be restored to a condition permitting it to be charged during a portion of the next positive half cycle of voltage impressed across anode 12 and cathode 13 of electric valve 10. In this manner electric valves 10 and 11 will conduct current alternately for predetermined equal intervals. The portion of each half cycle during which electric valves 10 and 11 conduct current may, of course be adjusted by means of the rotary phase shifter 18. Curve E represents the resultant unidirectional voltage impressed on the load circuit 2 when the load device 3 is substantially noninductive.

It will be noted that the electric valve 11 has been rendered conductive at a time during the positive half cycle of applied anode voltage corresponding to the time at which the electric valve 10 is rendered conductive by means of the control or excitation circuit 16 during the respective half cycle of anode voltage. If the phase shifter 18 is adjusted to reard still further the phase of the voltage of peaked wave form, as represented by curve B, the electric valve 10 will be rendered conductive at a later point in the positive half cycle of anode voltage and the electric valve 11 will be rendered conductive at a corresponding time during the succeeding positive half cycle of anode voltage applied to electric valve 11. In other words, the conductivity of the electric valve 11 is controlled to follow the electric valve 10 so that both electric valves conduct current for corresponding intervals during the respective positive half cycles of applied anode voltages.

Fig. 3 of the accompanying drawings diagrammatically represents an embodiment of my invention as applied to an electric valve system for transmitting energy between a three phase alternating current circuit 34 and a direct current circuit 35 through a transformer 36 having secondary windings 37, 38 and 39 and through electric valves 40, 41 and 42. The electric valves 40, 41 and 42 may be of the high vacuum type or may be of the type employing an ionizable medium such as a gas or a vapor. Each of the electric valves 40, 41 and 42 is provided with an anode 43, a cathode 44 and a control member 45. The embodiment of my invention shown in Fig. 3 is substantially the same as that shown in Fig. 1 and corresponding elements in the various excitation circuits have been assigned like reference numerals. Excitation circuits 46 and 47 are associated with electric valves 41 and 42, respectively, and render these valves conductive at times during the applied anode voltages corresponding to the times during positive half cycles of anode voltage at which the electric valve 40 is rendered conductive. Control circuits 46 and 47 are controlled in accordance with an electrical condition, such as the voltage of the electric valve preceding it in the order of phase rotation. For example, the control circuit 46 which is associated with electric valve 41 is controlled in accordance with the anode-cathode voltage of electric valve 40, and control circuit 47 which is associated with electric valve 42 is controlled in accordance with the anode-cathode voltage of electric valve 41.

The operation of the embodiment of my invention shown in Fig. 3 is substantially the same as that explained in connection with the embodiment of my invention shown in Fig. 1. Electric valve 40 will be rendered conductive at a predetermined time during each of the positive half cycles of anode voltage established by the phase relationship between the anode voltage and the voltage of peaked wave form impressed on control member 45 by the peaking transformer 17. The conductivity of the electric valve 40 will be maximum when there is substantial phase coincidence between the anode voltage and the voltage of peaked wave form, and the conductivity of the electric valve will be zero when there is substantial phase opposition between these voltages. For intermediate phase displacements, the conductivity of the electric valve 40 will, of course, assume corresponding intermediate values.

When the voltage impressed on the control member 45 of electric valve 40 is retarded in phase relative to the anode voltage, the capacitance 27 in excitation circuit 46 will be charged during the early portion of the positive half cycle to impress on the control member 45 of electric valve 41 a negative biasing potential to maintain valve 41 nonconductive until the anode-cathode voltage of that valve reaches a predetermined value to neutralize the effect of the negative biasing potential, thereby allowing that valve to conduct current. In like manner, the capacitance 27 in control circuit 47 for electric valve 42 will be energized in accordance with the voltage appearing across the anode and cathode of electric valve 41 to maintain electric valve 42 nonconductive until the proper time during the positive half cycle of anode voltage.

Although I have chosen to illustrate my invention as applied to systems for transmitting energy from an alternating current circuit to a direct current circuit, it should be understood that my invention in its broader aspects may be applied to electric valve translating systems for transmitting energy between alternating current and direct current circuits, or between alternating current circuits of the same or different frequencies. While my invention is susceptible of a wide range of applications, it will be readily understood that control systems of this nature may be applied with great facility to electric welding systems where it is highly desirable to provide flexibility of control without sacrificing precision and reliability of operation.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a pair of electric valves each comprising an anode, a cathode, and a control electrode, an external control circuit connected to the control electrode of only one of said valves for rendering said valve conductive for periods less than its positive half cycle of anode voltage, and means operative in accordance with the period of conductivity of said one valve for rendering the other valve conductive in its positive half cycle of anode voltage for a period of the same duration as the period of conductivity of said one valve.

2. In combination, a plurality of electric valves arranged to conduct current in a predetermined order and each comprising an anode, a cathode and a control electrode, an external control circuit connected to the control electrode of only one of said valves for rendering said valve conductive for periods less than its positive half cycle of anode voltage, and means connected to the control electrode of each of said other valves and to the valve immediately preceding it in the order of conduction for rendering each valve conductive in its positive half cycle of anode voltage for the same period as said one valve.

3. In combination, an electric translating circuit comprising a plurality of electric circuits each including a discharge path and being arranged to conduct current in a predetermined order and each path including a control member for rendering the associated discharge path conductive, means for energizing the associated control member of one of said discharge paths to render said path conductive at a predetermined time during a cycle of alternating voltage applied to said one of said paths, means energized in accordance with an electrical condition of a second of said circuits for effecting energization of the control member of the associated discharge path, and means energized in accordance with an electrical condition of said one of said paths for controlling the time at which said last mentioned means renders conductive said second discharge path.

4. In combination, a plurality of discharge paths each includinng an anode and a control member for rendering the associated discharge path conductive, means for controlling the voltage impressed on the control member of one of said discharge paths to render said one of said discharge paths conductive at a predetermined time during each positive half cycle of voltage applied to the associated anode, and means responsive to the voltage appearing across said one of said discharge paths for controlling the energization of the control member of a second discharge path so that said second discharge path is rendered conductive at corresponding times during the respective positive half cycles of anode voltage.

5. In combination, an electric translating circuit including a plurality of arc discharge paths for conducting current in a predetermined order and each including a control member for rendering the associated arc discharge path conductive, means for energizing the associated control member of one of said arc discharge paths to render said path conductive at a predetermined time during a cycle of alternating voltage applied to said one of said arc discharge paths, means responsive to the voltage appearing across a second arc discharge path for energizing the associated control member thereof, and means energized in accordance with the voltage appearing across said one of said arc discharge paths for controlling said last mentioned means to render said second discharge path conductive at a corresponding time during the succeeding cycle of anode voltage applied to said second discharge path.

6. In combination, an electric translating circuit including a plurality of electrically displaced windings, a plurality of arc discharge paths each associated with a predetermined different one of said windings and arranged to conduct current in a predetermined order and each including a control member for rendering the associated arc discharge path conductive, means for energizing the control member of one of said arc discharge paths to render said one of said paths conductive at a predetermined time during a positive half cycle of voltage, and a plurality of excitation circuits each associated with a different one of the other of said arc discharge paths and each comprising means responsive to the voltage of the associated arc discharge path for energizing the control member to render the associated path conductive and an energy storage device energized in accordance with an electrical condition of a predetermined different one of said arc discharge paths for controlling said last mentioned means to render the associated arc discharge path conductive at a corresponding time during the succeeding positive half cycle of voltage applied to said associated arc path.

7. In combination, a supply circuit, a load circuit, electric translating apparatus including a plurality of phase windings, a plurality of discharge paths each associated with a different phase winding and each including a control member for controlling the transfer of energy between said supply circuit and said load circuit, an external control circuit for energizing the control member of one of said discharge paths to render said path conductive for an interval less than the positive half cycle of voltage applied to said path, means responsive to the voltage of a second discharge path for energizing its associated control member, and means comprising an energy storage device energized in accordance with the voltage of the discharge path preceding it in the order of conduction for controlling the energization of said control member of said second discharge path to render said path conductive in its positive half cycle of applied voltage for a period of the same duration as the period of conductivity of said one of said discharge paths.

8. In combination, a plurality of arc discharge paths each including an anode and a control member for rendering the associated arc discharge path conductive, means for impressing on the control member for one of said arc discharge paths a control voltage adjustable in phase relative to the voltage impressed on the associated anode to render said one of said arc discharge paths conductive at a predetermined time during each positive half cycle of voltage applied to the associated anode, and means for rendering the other of said arc discharge paths conductive at corresponding times during the respective positive half cycles of anode voltages comprising a plurality of excitation circuits each associated with a different one of said other of said arc discharge paths and each comprising an energy storage device energized in accordance with an electrical condition of the arc discharge path preceding it in the order of phase rotation for impressing on the associated control member a negative biasing potential and an inductive device responsive to an electrical condition of the associated arc discharge path for rendering said negative biasing potential ineffective.

9. In combination, a plurality of arc discharge paths arranged to conduct current in a predetermined order and each including an anode and a control member for rendering the associated arc discharge path conductive, means for controlling the phase of the voltage impressed on the control member of one of said arc discharge paths to render said one of said paths conductive at a predetermined time during each positive half cycle of voltage applied to the associated anode, and a plurality of excitation circuits for the other of said arc discharge paths for rendering the other of said paths conductive at corresponding times during the respective positive half cycles of anode voltage each comprising a capacitance, a unidirectional conducting device, means for charging said capacitance in accordance with the voltage appearing across the arc discharge path preceding it in the order of phase rotation for charging said capacitance through said unidirectional conducting device to impress on the associated control member a negative unidirectional biasing potential to maintain the associated arc discharge path nonconductive and means responsive to the voltage of the associated arc discharge path for introducing in said excitation circuit a voltage to render ineffective said negative biasing potential and to effect energization of said associated control member.

10. In combination, an electric translating circuit including a plurality of electric circuits each including an electric valve means having an anode, a cathode and a control member and arranged to conduct current in a predetermined order, an excitation circuit for energizing the control member of one of said electric valve means to render said electric valve means conductive at a predetermined time during each positive half cycle of anode-cathode voltage, and a plurality of excitation circuits for the other of said electric valve means for rendering said other of said electric valve means conductive at corresponding times during the respective positive half cycles of anode-cathode voltage each comprising a capacitance, a unidirectional conducting device, means responsive to the anode-cathode voltage of a predetermined one of said electric valve means for charging said capacitance through said unidirectional conducting device to impress on the control member of the associated electric valve means a negative unidirectional biasing potential to maintain the electric valve means nonconductive and means responsive to the anode-cathode voltage of the associated electric valve means for rendering ineffective said negative biasing potential and for effecting energization of the associated control member.

11. In combination, an electric translating circuit including a plurality of electrically displaced phase windings, a plurality of electric valve means each associated with a different one of said phase windings and arranged to conduct current in a predetermined order and each including an anode, a cathode and a control member for rendering the electric valve means conductive, means for energizing the control member of one of said electric valve means to render said one electric valve means conductive at a predetermined time during each positive half cycle of anode-cathode voltage, and a plurality of excitation circuits each associated with a different one of the other of said electric valve means for energizing the associated control member to render said other of said electric valve means conductive at corresponding times during the respective positive half cycles of anode-cathode voltage each comprising a capacitance, a unidirectional conducting device, means for charging said capacitance through said unidirectional conducting device in accordance with the anode-cathode voltage of the electric valve means preceding it in the order of phase rotation to impress on said control member a negative unidirectional biasing potential and means responsive to the anode-cathode voltage of the associated electric valve means for introducing in the excitation circuit a voltage to render said biasing potential ineffective.

12. In combination, a supply circuit, a load circuit, electric translating apparatus interconnecting said circuits and including a plurality of phase windings, a plurality of electric valve means each associated with a different one of said windings and each including an anode, a cathode and a control member for controlling the transfer of energy between said supply circuit and said load circuit, an external phase shifting circuit for energizing the control member of one of said electric valve means to render said valve means conductive for intervals less than its positive half cycle of anode voltage, and means to render a second electric valve means conductive in its positive half cycle of anode voltage for a period of the same duration as the period of conductivity of said one electric valve means comprising a transformer connected across the anode and cathode of said second electric valve means for energizing its associated control member, a capacitance connected to said control member of said second electric valve means through a winding of said transformer, a rectifier and a second transformer connected across said one of said electric valve means for charging said capacitance through said rectifier to impress on said control member of said second electric valve means a negative biasing potential to determine the time in each positive half cycle of anode voltage at which said second valve means is rendered conductive.

DUDLEY E. CHAMBERS.